United States Patent [19]

Lundquist et al.

[11] Patent Number: 4,817,113

[45] Date of Patent: Mar. 28, 1989

[54] RANGE ESTIMATION USING FLOATING REFERENCE POINTS

[75] Inventors: Alan E. Lundquist; Samuel C. Kingston, both of Salt Lake City; Billie M. Spencer, Bountiful; John W. Zscheile, Jr., Farmington, all of Utah

[73] Assignee: Unisys Corporation, Blue Bell, Pa.

[21] Appl. No.: 44,632

[22] Filed: May 1, 1987

[51] Int. Cl.[4] .......................... H04L 9/00; G01S 13/08
[52] U.S. Cl. ......................................... 375/1; 342/132; 342/451
[58] Field of Search ................. 375/1; 380/34; 342/98, 342/118, 126, 129, 132, 145, 146, 450, 451

[56] References Cited

U.S. PATENT DOCUMENTS

| | | | |
|---|---|---|---|
| Re. 28,725 | 2/1976 | Hutchinson et al. | 342/353 |
| 3,171,121 | 2/1965 | Solga | 343/6.5 |
| 3,263,231 | 7/1966 | Smith et al. | 342/393 |
| 3,304,409 | 2/1967 | Snowdon et al. | 235/61.5 |
| 3,378,842 | 4/1968 | Phillips | 343/112 |
| 3,713,025 | 1/1973 | Mc Nair | 375/1 |
| 3,866,229 | 2/1975 | Hammack | 343/112 R |
| 3,922,533 | 11/1975 | Royal et al. | 235/150.25 |
| 3,982,246 | 9/1976 | Lubar | 343/112 |
| 4,092,598 | 5/1978 | Deman et al. | 342/359 |
| 4,179,697 | 12/1979 | Golinsky | 343/112 |
| 4,388,723 | 6/1963 | Keen | 375/1 |
| 4,455,651 | 6/1984 | Baran | 375/1 |
| 4,513,285 | 4/1985 | Pike et al. | 342/98 |
| 4,530,103 | 6/1985 | Mosley et al. | 375/1 |
| 4,532,636 | 7/1985 | Wilkinson | 375/1 |
| 4,679,207 | 7/1987 | Tsvda | 375/1 |
| 4,716,574 | 12/1987 | Baier et al. | 375/1 |

Primary Examiner—Salvatore Cangialosi
Attorney, Agent, or Firm—John B. Sowell; Mark T. Starr; Thomas J. Scott

[57] ABSTRACT

A method of rapidly reacquiring a pseudonoise spread spectrum coded signal after short outages includes calculating the new positions of the moving stations relative to the old positions of the moving stations and for determining the accurate displacement and the accurate direction the platforms have moved in their new direction after a short time outage. The method includes calculating a triangle which includes the displacement between the moving stations' old position and the moving stations new position and the included angle between the direction of movement and the line of sight between said moving platforms at the time of outage. A range displacement adjustment is calculated on the basis of the triangle for each moving station and the range factor resulting from this calculation is applied to the PN generators of the receiver and transmitter in each of the moving stations to independently adjust for each station's movement. The directional antennas of the moving stations are pointed in new directions toward the area in which the other moving station will be found. The directional antennas are moved simultaneously toward each other and a sweep or reacquisition adjustment of the PN generators of each moving station is made employing a small window of uncertainty which results in reacquisition of the PN coded signal being transmitted from the other station.

8 Claims, 2 Drawing Sheets

RANGE ESTIMATION USING FLOATING REFERENCE POINTS

RELATED APPLICATIONS

This application is related to our pending applications entitled "DATA LINK TIME SELF-COMPENSATION SYSTEM" and "ANTENNA EQUAL INVERSE ANGLE ACQUISITION", Ser. Nos. 06/560,037 and 06/560,038 filed Dec. 9, 1983 (both under Patent Office Secrecy Order).

BACKGROUND OF THE INVENTION

1. Field of the Invention

This invention relates to data link acquisition and reacquisition systems. More specifically, the present invention relates to a data link system between two stations, platforms or aircraft both of which are rapidly moving relative to each other during periods of communication outage and the invention concerns an optimum method of reacquisition of the spread spectrum code signals.

2. Description of the Prior Art

This invention is an improvement over our two aforementioned related pending applications and is concerned with optimizing or reducing the reacquisition time after short periods of outage. The two above mentioned applications show and claim apparatus and method for reducing acquisition time after long outages. Our former application employs a system for advancing the spread spectrum coded signals being transmitted from the transmitting station relative to a reference clock by a predetermined first time vector. The receiving portion of the system employs means for retarding the replica spread spectrum coded signals being received relative to the same reference clock by a predetermined second time vector. The present invention permits both stations to independently advance or retard their transmitted coded signals and also the replica code generators based on a range approximation when the receiving and transmitting stations are pointing their directional antennas directly at each other, thus, reducing the window of search time to a minimum during sequential attempts to achieve lock-on or acquisition at different search angles or positions of the antenna.

Our latter application employs a method of pointing the receiving and the transmitting antennas on equal and inverse pointing directions and then preceding to search by moving the direction of the antennas toward each other. As the antennas are moved to sequential cell positions each cell position is held during an acquisition attempt knowing that the equal and opposite movement of the antenna positions will eventually result in the receiving and transmitting antennas pointing exactly toward each other. The latter application offers a great improvement in acquisition time after long outages. The present invention further improves acquisition time by reducing the number of cells to be searched after short outages, thus, reducing reacquisition time which occurs after a previous acquisition had been achieved. The present invention improves the acquisition time required for both previous inventions and is extremely useful in situations where the platform, station or aircraft is making an intelligence gathering mission over unfriendly territory.

The present invention makes it possible to search fewer chips in a long sequence pseudonoise spread spectrum code so as to achieve reacquisition between a fast moving platform and a home station more rapidly than was heretofore achievable when there is a short outage.

SUMMARY OF THE INVENTION

It is a principal object of the present invention to provide a high speed reacquisition method for data links employing pseudonoise spread spectrum codes.

It is another object of the present invention to provide a high speed reacquisition method for data links which achieves rapid lock-up after short periods of outage time.

It is another object of the present invention to provide a simple method of computing the approximate range between two stations that have moved from their previous known locations when neither of the moving stations has a knowledge of the location of the other station.

It is yet another object of the present invention to provide a method of approximating range between stations which do not have a knowledge of the location of the other station that self compensates for signal propagation time between the two move stations.

According to these and other objects of the present invention there is provided in a data link system means in each of two moving stations to calculate its new position relative to its old position and for determining its approximate displacement toward or away from the other station based on the assumption that the short outage time has not permitted the other station to have moved outside of a search cone equal to approximately more than three antenna cone angle search positions.

DESCRIPTION OF THE PREFERRED EMBODIMENT

Figure 1:
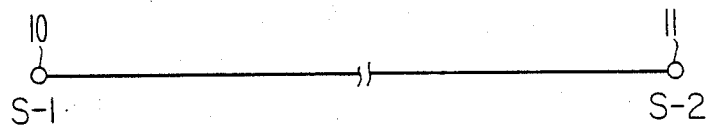
FIG. 1 is a schematic drawing depicting two stations, platforms or aircraft before an outage has occurred and the two stations have knowledge of the other's position.

Refer now to FIG. 1 showing a first platform, station or aircraft 10 also designated as S1 and a second station 11 also designated S2. Each of the stations 10 and 11 are equipped with navigational systems which permit them to know their X, Y and Z positions in space. Thus, each station is capable of calculating the range between stations when the data link is active. More importantly each station 10 and 11 is equipped with ranging system which allows each station to accurately determine the distance to the other when the data link is active. Once the transmitting and receiving stations of each of the stations 10 and 11 have employed their pseudonoise (PN) spread spectrum data link systems to communicate with each other they can accurately determine the pointing direction of their transmitting-receiving antenna.

Figure 2:
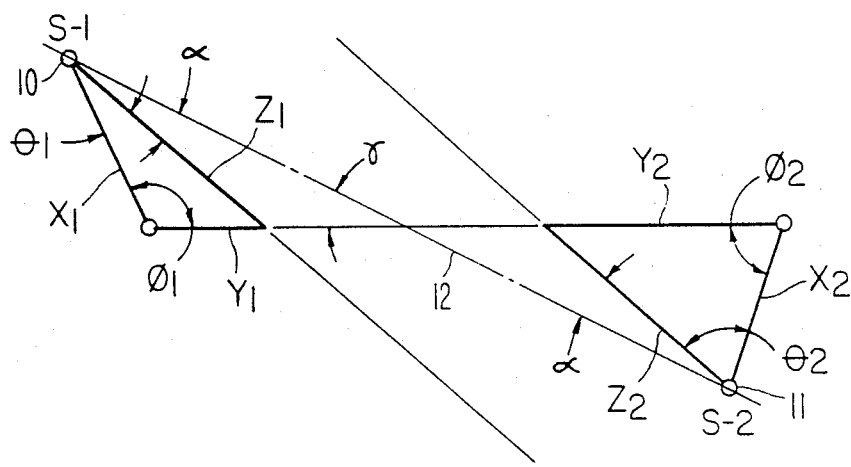
FIG. 2 is a schematic drawing of the same two stations after an outage has occurred and after the two stations have moved to their new positions which are unknown to each other.

Refer now to FIG. 2 which is a schematic drawing showing stations 10 and 11 moved from their position shown in FIG. 1 to new positions shown in FIG. 2 during a time of outage which only permits the stations 10 and 11 to figure their own new positions and not the position of the other station having lost communication between the data links. Station 1 knows its displacement X1 and also the angle $\phi 1$. Since both stations know the time of outage, station 1 is able to determine the angle $\phi 1$ which is representative of a worse case condition for the time outage which has occurred that will permit the station SI to start a sweep to locate station S2. Having assumed the desirable pointing direction along the axis of side Z1 it is possible to determine the length of side Y1 of the triangle X1, Y1, Z1. Similarly the position of station 11 in space is known and the former position of the station was known, thus, the side of the triangle X2 is known. The angle $\phi 2$ is known and the angle $\phi 2$ is calculated to be the equal and opposite inverse angle to $\phi 1$ so that the line of sight of line Z2 and line Z1 are parallel as explained in our copending application Ser. No. 06/560,038. For purposes of this application the antenna equal inverse angle acquisition method may be employed. Since the deviation of the alignment of the directional antenna does not vary more than three antenna cone angles during short outages for purposes of this invention, the antenna may be displaced a predetermined number of cone angles in a predetermined direction based on time of outage in order to make the sweep search. Assuming that the station 10 in FIG. 2 wants to approximate its change in range (or delta range position) it calculates that its delta range adjustment is a distance equal to Z1 minus Y1. Similarly station 11 assumes that its delta range adjustment is the distance equal to Z2 minus Y2. While this range adjustment is not exact for the angles shown it will be understood that when the directional antenna of the stations 10 and 11 are pointing toward each other along the axis 12, which occurs during an acquisition search operation, the delta range adjustment is highly accurate and is theoretically exact.

Figure 3:
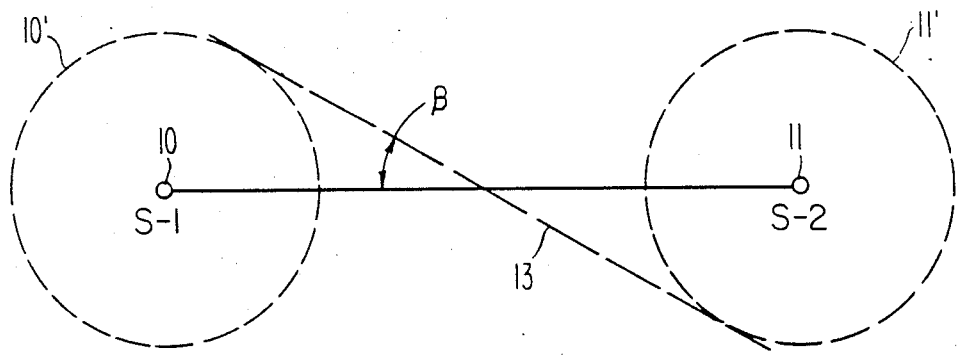
FIG. 3 is a schematic drawing employed to illustrate a worse case movement of two stations relative to each other during a time outage period that could produce a cone of uncertainty which includes three antenna cone angle search positions.

Refer now to FIG. 3 which is a schematic drawing showing the position of stations 10 and 11 as previously described in FIG. 1 and superimposed thereon is a maximum change of position range circle 10' centered about the point 10 at the time of outage. Circle 11' is representative of the maximum deviation range circle surrounding the point 11 at the time of outage. The axis or line 13 which forms a tangent to circles 10' and 11' shows the maximum search angle beta ($\beta$) that the station S1, if located anywhere within the circle 10', would have to search to locate a station S2 located anywhere within the circle 11'. It has been determined that any time the angle beta is less than 3 antenna cone angles, which are representative of search cell positions and the antenna beam width, that the present invention method offers an enhancement and improvement over the prior art. If the angle beta is greater than the amount of about three antenna cone angles or search cell positions then the prior art method may be employed. The transmitting and receiving stations explained in our prior art application Ser. No. 06/560,038 may also be employed to implement the present invention method and will be explained briefly hereinafter.

Figure 4:
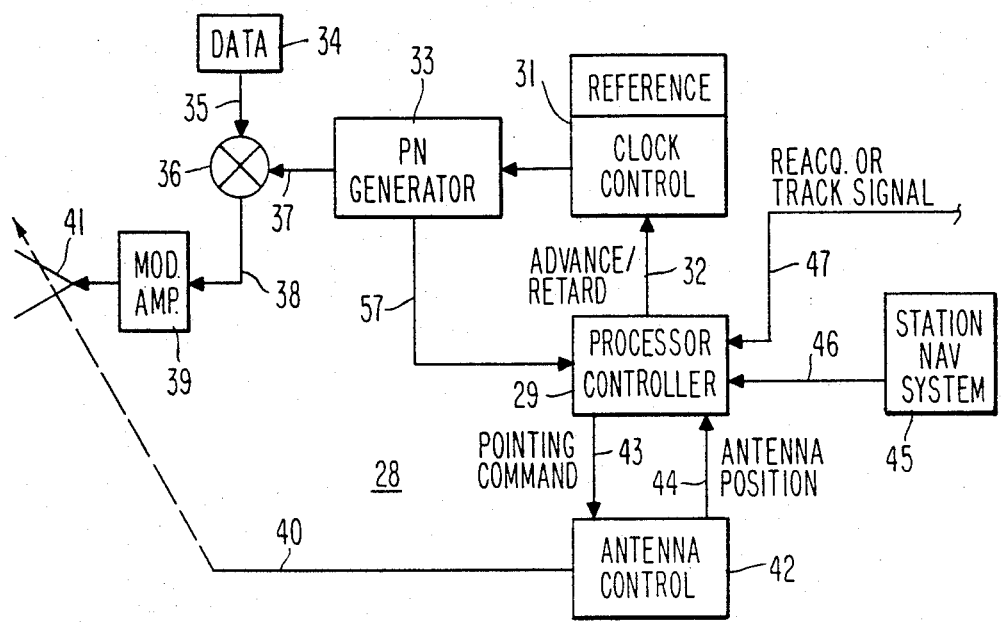
FIG. 4 is a schematic block diagram of a transmitter adapted to employ the present invention.
Figure 5:
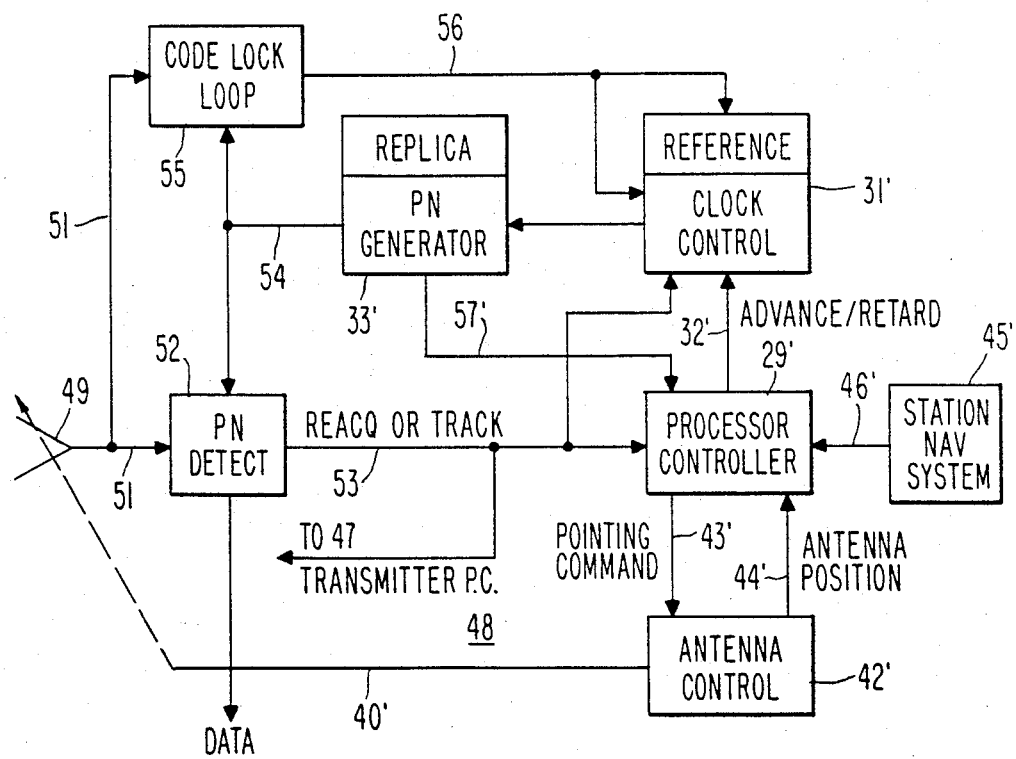
FIG. 5 is schematic block diagram of a receiver adapted to employ the present invention.

Refer now to FIGS. 4 and 5 showing the present invention structure which may be employed to perform the present invention method. FIG. 4 is a schematic block diagram of a transmitter 28 of the type employed in stations 10 and 11. The processor-controller 29 is adapted to coordinate the search of the antenna cells described hereinbefore. The clock control 31 contains a clock that was originally synchronized with the clock in receiver 11 and control means are provided therein which enable the processor-controller 29 to advance or retard the clock via bus 32. Retarding or advancing the clock 31 advances or retards the PN phase positions of the PN code being generated by PN generator 33. Data generated at block 34 is applied via line 35 to mixer 36 along with the phase shifted PN code on line 37 to produce PN coded signals on line 38. The PN coded signals are modified and condition for transmission at the modulator-amplier 39 before being applied to antenna 41. Antenna control 42 receives its pointing commands from processor-controller 29 via bus 43 and control antenna via line 41. The antenna control 42 in turn indicates to the processor-controller 29 its pointing position via bus 44 with respect to the station's navigation system (45).

The station navigation system 45 provides processor-controller 29 via bus 46 with all the necessary station coordinate information with respect to the stations position in space. In the preferred embodiment of the present invention the coordinate and position information of the station 10 in the two positions described hereinbefore with regards to FIGS. 1 and 2 is available at processor 29. With this information, plus the antenna pointing direction at the time of outage and the antenna assumed pointing direction along the axis of line Z1, it is possible to calculate the distances X1, Y1 and Z1 knowing $\theta 1$ and $\phi 1$.

The processor-controller 29 calculates Z1 minus Y1 and converts this into chips or PN code positions. When the distance Z1 minus Y1 is positive the processor-controller and station 10 assumes that the relative movement of stations 10 is away from station 11 and the PN generator 33 is advanced to compensate for this assumed relative movement. It will be understood that if the determination that Z1 minus Y1 is negative than the assumption will be that station 10 has moved closer to station 11. As will be explained in greater detail hereinafter with regards to FIG. 5, the receiver in station 10 will have its replica PN generator 33' advanced or retarded by the same number of chip or code positions as the PN generator 33 in transmitter 28.

In the transmitter of station 11 there is a transmitter 28 similar to that shown and described with respect to FIG. 4 in station 10. The processor-controller 29 in station 11 will make the calculation Z2 minus Y2 to determine the number of chips or code positions employed for range compensation correction in its PN generators 33 and 33' as explained hereinbefore.

The processor-controllers 29 in the stations 10 and 11 are now supplied with sufficient information to determine the necessary assumed antenna coordinate positions and to determine the antenna pointing direction of stations SI and S2 with respect to fixed space. The processor-controllers also supplies the inverse angle coordinate information on line 43 to enable the antenna control 42 to properly point antenna 41 with respect to the stations coordinate system via control line 40 prior to starting a sweep to reacquire the communication link.

The processor-controller 29 is connected via line 47 to the receiver 48 in its own station. The receiver 48 (shown in FIG. 5) is capable of determining that there has been an outage and is capable of sweeping the directional antenna and holding the directional antenna on a cone angle in an attempt to reacquire the communication link.

FIG. 5 is a schematic block diagram of a receiver 48 of the type employed in stations 10 and 11. Receiver 48 will be employed to illustrate the manner in which a receiver is adapted to receive signals from a transmitter 28 of FIG. 4. Signals transmitted by antenna 41 of transmitter 28 are received at antenna 49 and supplied via line 51 to PN detector 52. The process signal output on line 53 indicates whether the receiver 48 is locked-on to the received signal or an outage still exists. The processor-controller 29' receives the tracking or reacquisition signal on line 53 as well as the antenna directional signals on line 44' from the antenna control 42'. Position information on line 46' from the navigation system 45' is supplied as was described hereinbefore with regards to transmitter 28 and navigation system 45. When receiver 48 is locked onto the incoming PN coded signal, the replica PN generator 33' is producing a PN coded signal on line 54 which is synchronized with the incoming coded signal on line 51. The code locked loop 55 compares the code signals on line 51 and 54 to maintain synchronization by producing a voltage error control signal line 56 to continuously adjust clock control 31'. When the signal on line 53 and 47 indicates to the clock control 31' that there is an outage, the clock 31' is controlled by processor 29' via line 32'

Before lock-on can occur, the processor-controller 29' must make an advance or retard adjustment to clock control 31' based on the range adjustment Z2 minus Y2 plus allowance for the residual range uncertainty which is representative of a window comprising the number of chips to be searched. At each antenna cell pointing position during an attempted acquisition, the entire residual range uncertainty must be searched to assure acquisition if the antennas are pointing toward each other and within each other's antenna cone. It will be understood that once the code is acquired, the search is discontinued and the processor switches from the search to the track mode.

It can be shown that the window of uncertainty or residual range of uncertainty is extremely small when the chip or code rate is not extremely high. For example, employing a chip rate of 10 megachips per second and using a 1° cone angle directional antenna installed in aircraft flying at 450 knots under a worse direction condition and assuming an outage time of only 10 seconds, the range of uncertainly is less than ±1 chip.

The size of the window of uncertainty ($W_u$) can be calculated by the formula:

$$W_u = [X1 \sin\phi1 + X_2\sin\phi2] \left[ \frac{1 - \cos(\alpha + \gamma)}{\sin(\alpha + \gamma)} - \left( \frac{1 - \cos}{\sin\gamma} \right) \right].$$

The distances X1 and X2 and the angles $\phi$, $\alpha$ and $\gamma$ are shown in FIG. 2. Even at higher chips rates such as 500 megachips per second it can be shown that the number of chips in the window of uncertainty is less than ±50 chips employing the assumptions above. Thus, the time for searching and/or acquiring the code in a cell position is reduced by employing the present invention.

A transmitter 28 and receiver 48 are in station 10 and its processor-controllers 29, 29' and antenna controls 42, 42' are controlled via lines 43', 44' to sweep through the several cell positions represented by the maximum cone of search beta ($\beta$) shown in FIG. 3 while the transmitter 28 and receiver 48 of station 11 also sweeps through the same cell positions in an equal inverse angle mode. When station 11 moves its antenna to the cell position that points directly toward station 10 both stations 10 and 11 perform the window of uncertainty search to assure that lock-on will occur sometime during the search operation. Thus, it will be appreciated that the time required for lock-on in the present invention only requires the time for synchronizing the PN coded signals when they are displaced by a very small window of uncertainty.

Having explained the preferred embodiment of the present invention it will be understood that reacquisition of pseudonoise spread spectrum coded signals is accomplished faster than was heretofore possible employing the specialized case mentioned herein. The present invention method also permits other types of search of the directional antenna and need not necessarily employ the equal and inverse angle method. For example, when the FIG. 3 worst case condition exists, only a few cells need to be searched. The classical prior art antenna search method may be employed wherein one antenna is held in one position while the other antenna is scanned through its cone uncertainty. Then the first antenna is moved to a new search position and the second antenna is again moved through its cone of uncertainty until lock-on is achieved. At each cell position an attempt is made to lock on to the code by scanning the window of uncertainty. The angle B in FIG. 3 may be greater than three cone angles when the range is relatively short or the cone of the directional antenna is extremely small and the present invention still achieves reacquisition faster than the prior art methods.

Having explained the preferred embodiment of the present invention it will be understood that reacquisition of pseudonoise spread spectrum coded signals may be achieved under special conditions where there are short outages at much faster rates than achieved in our aforementioned copending applications as well as the prior art.

What is claimed is:

1. A method of reacquiring a pseudonoise (PN) spread spectrum coded signal transmitted from one moving platform to another moving platform after a outage, comprising the steps of:

calculating the distance X and the direction of movement at the new location from the last outage for each moving platform, calculating the included angle $\phi$ between the antenna pointing direction at the last outage and the direction to the new location for each moving platform, assuming a new pointing direction for the directional antenna which will include the circle of uncertainty of the other platform whose PN code signal is to be acquired during a sweep operation for each moving platform, calculating the angle $\theta$ between the new antenna pointing direction and the direction to the new location from the point of outage for each moving platform, calculating the length of the sides of the triangle Z and Y which are opposite the angles $\phi$ and $\theta$ and adjacent to side X for each moving platform, advancing or retarding the PN generators in each moving platform by range factor equal to Z minus Y, sweeping the directional antennas of each moving platform toward each other, and adjusting the PN generators and said moving platform through a predetermined window of uncertainty to rapidly acquire the PN coded signals being transmitted from the other moving platform.

2. A method of reacquiring a pseudonoise coded signal as set forth in claim 1 wherein the window of uncertainty remains constant during each sweep of the directional antennas toward each other.

3. A method of reacquiring a pseudonoise coded signal as forth in claim 1 where the amount of advancing or retarding of the PN generators by each moving station is recalculated as a factor Z minus Y at each position of the directional antenna until the PN code is acquired.

4. A method of reacquiring a pseudonoise coded signal as set forth in claim 3 wherein the distance Z1 plus Z2 is the range between the moving platforms when the directional antennas are pointing at each other.

5. A method of reacquiring a pseudonoise coded signal as set forth in claim 1 wherein the window of uncertainty is less than 50 chips for a chip rate of 500 megachips per second for low flying aircraft having directional antennas with 1° cone angles.

6. A method of reacquiring a pseudonoise coded signal as set forth in claim 1 wherein the window of uncertainty is less than 1 chip for a chip rate of 10 megachips per second for low flying aircraft having directional antennas with 1° cone angles.

7. A method of reacquiring a pseudonoise coded signal as set forth in claim 1 wherein the circle of uncertainty of the to be acquired is within a sector no greater than the number of degrees defined by ±3 cone angles of the directional antennas.

8. A method of reacquiring a pseudonoise coded signal as set forth in claim 1 wherein the step of assuming a new pointing direction for the directional antennas includes the step of pointing said antennas toward each other on lines of sight which are parallel to each other on equal inverse opposite directions and the step of sweeping the directional antennas of said moving platforms includes simultaneously sweeping the directional antennas toward each other in incremental steps which do not exceed the cone angles of the directional antennas.

* * * * *